(12) United States Patent
Hu et al.

(10) Patent No.: US 6,205,181 B1
(45) Date of Patent: *Mar. 20, 2001

(54) INTERLEAVED STRIP DATA STORAGE SYSTEM FOR VIDEO PROCESSING

(75) Inventors: Xiaoping Hu, San Jose; Hungviet H. Nguyen, Fremont; David Sokmin Kang, San Jose, all of CA (US)

(73) Assignee: Chips & Technologies, LLC, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,193

(22) Filed: Mar. 10, 1998

(51) Int. Cl.⁷ ..................................... H04N 7/12
(52) U.S. Cl. ................. 375/240.26; 348/393.1; 348/717; 375/240.24
(58) Field of Search .................. 348/384.1, 386.1, 348/391.1, 393.1, 396.1, 407.1, 402.1, 413.1, 416.1, 420.1, 425.1, 425.3, 450, 453, 715–719; 375/240.08, 240.24, 240.26

(56) References Cited

U.S. PATENT DOCUMENTS

| | | | |
|---|---|---|---|
| 4,250,502 | 2/1981 | Klauck et al. ...................... 340/728 |
| 4,743,970 | * 5/1988 | Barnett et al. ..................... 348/717 |
| 4,745,462 | * 5/1988 | Dischert et al. ................... 348/717 |
| 4,758,881 | * 7/1988 | Laspada .............................. 348/560 |
| 4,772,938 | * 9/1988 | Sasson ................................ 348/717 |
| 4,924,375 | 5/1990 | Fung et al. ......................... 364/200 |
| 4,954,987 | 9/1990 | Auvinen et al. ................. 365/189.02 |
| 5,003,496 | * 3/1991 | Hunt, Jr. et al. ................. 345/428 X |
| 5,065,346 | 11/1991 | Kawai et al. ....................... 395/128 |
| 5,088,053 | 2/1992 | Sprague et al. .................... 395/166 |
| 5,142,363 | 8/1992 | Johary et al. ...................... 358/140 |
| 5,146,554 | * 9/1992 | Statt .................................... 358/456 |
| 5,428,456 | 6/1995 | Parulski et al. .................... 358/340 |
| 5,486,876 | * 1/1996 | Lew et al. .......................... 348/719 |
| 5,506,621 | * 4/1996 | Ogasawara et al. ............. 348/396.1 |
| 5,541,658 | * 7/1996 | Ishiwata ............................ 348/394 |
| 5,583,572 | * 12/1996 | Sumihiro ........................... 348/396 |
| 5,805,821 | * 9/1998 | Saxena et al. .................. 395/200.61 |
| 5,920,352 | * 7/1999 | Inoue ................................. 348/384 |
| 5,974,179 | * 10/1999 | Caklovic ........................... 382/232 |
| 5,982,425 | * 11/1999 | Allen et al. ........................ 348/231 |
| 5,987,178 | * 11/1999 | Anesko et al. .................... 382/236 |
| 6,052,149 | * 4/2000 | Barnaby ............................ 348/396 |

* cited by examiner

*Primary Examiner*—Vu Le
(74) *Attorney, Agent, or Firm*—Thelen Reid & Priest LLP; David B. Ritchie (57) ABSTRACT

A method and apparatus for storing a macroblock from a video data stream is disclosed. A macroblock is received, the macroblock having a plurality of blocks corresponding to a plurality of color space components and having a width defined by a plurality of pixels. According to a first aspect of the present invention, the macroblock is stored in a vertical strip format. According to a second aspect of the present invention, the contents of the plurality of blocks are interleaved. According to a third aspect of the present invention, the contents of the plurality of blocks are interleaved and the macroblock is then stored in a vertical strip format.

21 Claims, 8 Drawing Sheets

Y BLOCKS

U BLOCK

V BLOCK

INTERLEAVED STRIP DATA STORAGE SYSTEM FOR VIDEO PROCESSING

BACKGROUND OF THE INVENTION

1. Field of the Invention

The present invention relates to a format for storing the color space data for video processing. More particularly, the present invention relates to a method for interleaving the color space data and a method for storing the color space data in a strip format.

2. The Background Art

With the merging of personal computer systems and entertainment systems, digital component video and audio were developed. Typically, this audio and video data are encoded into a compressed program stream for transmission. A stream demultiplexer parses the incoming program stream into audio and video bitstreams. When frames are ultimately displayed, there must be a decompression of these compressed video bitstreams. A video decoder is used for this decompression, or decoding, process.

Figure 1:
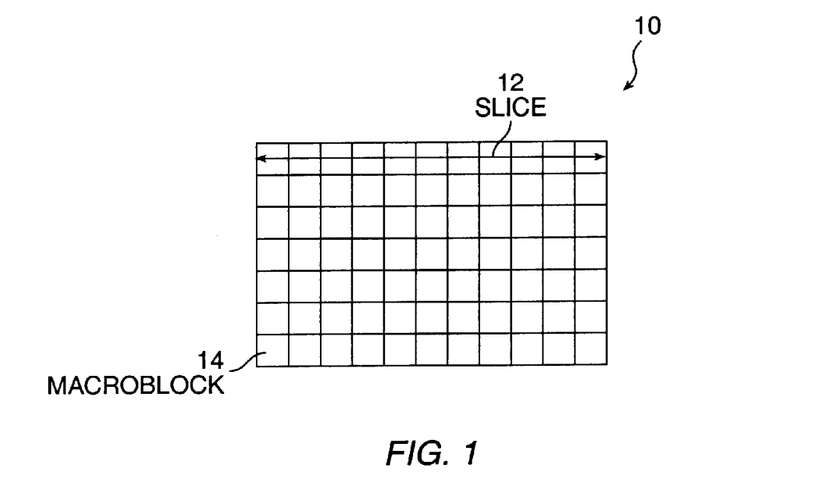
FIG. 1 illustrates a video frame divided into macroblocks.

A video stream is made up of a number of still frames, or pictures. Referring first to FIG. 1, a representation of a frame 10 is shown. Each frame 10 comprises a plurality of horizontal slices 12, each of which includes a plurality of macroblocks 14. A typical macroblock size is 16 lines×16 pixels. A frame, or picture, resolution of 720×576 is defined by 720×576 pixels which correspond to 45×36 macroblocks.

Figure 2A:
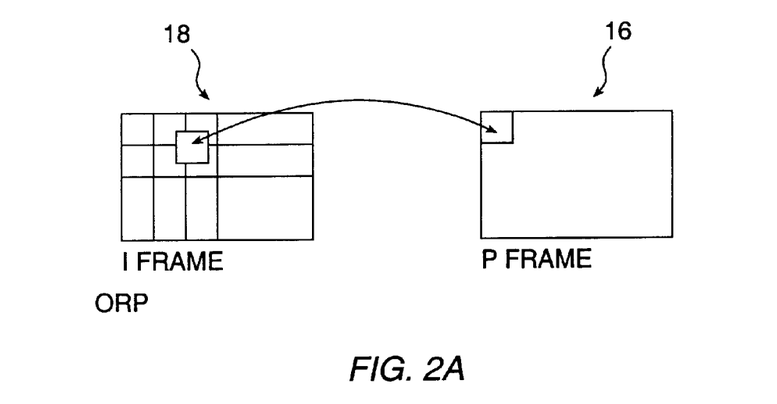
FIG. 2A illustrates a P frame created using forward prediction.
Figure 2B:
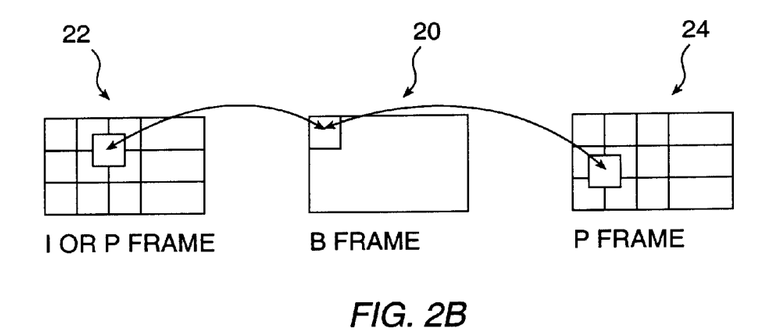
FIG. 2B illustrates a B frame created using bidirectional prediction.

Many international standards, such as the MPEG 2 standard, are used for digital video compression and decompression. MPEG standards take advantage of the redundancy on a frame-to-frame basis of a motion video sequence. According to the MPEG 2 standard, there are three types of coded frames: I (intra) frame, P (predicted) and B(bidirectionally predicted). Frame prediction may occur using forward or backward prediction. Forward prediction occurs when a future frame is constructed from a previous frame in a sequence of frames. Backward prediction occurs when a future frame in a sequence of frames is used to predict a current or past frame in the sequence of frames. An I frame contains a stand-alone still image, and each macroblock within the I frame can be decoded without using information from another frame. As shown in FIG. 2A, a P frame 16 is coded relative to the nearest previous I or P frame 18. Similarly, as shown in FIG. 2B, a B frame 20 is coded relative to two reference frames, the closest previous I or P frame 22 and the closest future P frame 24.

During decoding, the first frame received is an I frame, which serves as a reference frame for later B and P frames. From the encoded video bitstream, the video decoder reconstructs the I frames. Using the I frames, the P and B frames are generated using additional encoded data and motion vectors. Therefore, P and B frames are constructed using differential data relative to this I frame.

Reconstruction of each B and P macroblock is based on motion vectors, and is performed through the addition of a differential macroblock to a reference macroblock. For example, for a B frame inter-macroblock having two references, the two reference macroblocks are averaged to produce the final macroblock. This macroblock is then added to the differential macroblock.

Each macroblock comprises a plurality of pixels, each of which is defined by color space components. A color space is a mathematical representation for a color. Different color spaces which provide different ways of representing a color which will ultimately be displayed in a video system. For example, the red, green, and blue (RGB) color space is commonly used in computer graphics. Similarly, the YUV color space represents the luma component Y, or black and white portion, as well as the color difference components U and V. A macroblock in YUV format contains data for all Y, U, V components. Since many video compression standards compress data on a macroblock by macroblock basis, the compressed data stream must also be decoded on a macroblock by macroblock basis. In this manner, the encoding process is reversed to display the encoded information.

Digital encoded video data must be stored and processed during video decoding. Data storage systems used for internal storage during video decoding can optimize data accesses during video decoding. In addition, various data access modes may be used to increase the efficiency of the decoding process.

Sequential transfer modes, such as a burst mode, are often used to improve system throughput in data intensive applications. In this manner, the speed of movement of large sequential blocks of data is substantially increased. When a burst access mode is used, addresses are incremented to read each sequentially stored byte of data. However, a jump to a wholly different location in memory cannot be performed to read the next byte. The full capability of a sequential transfer mode, therefore, can be realized only through the sequential storage of each byte of data.

Pixels in each macroblock are traditionally stored in blocks since they are compressed. Three types of macroblocks are available in MPEG 2 . The 4:2:0 macroblock consists of four Y blocks, one U block, and one V block. In the 4:2:0 chroma format, for each 16×16 pixel Y block, the corresponding U and V blocks have size 8×8 pixels. In other words, for every 4 Y pixels, 1 U and 1 V pixel are shared. Most MPEG 2 decoders use the 4:2:0 chroma format for internal storage.

A 4:2:2 macroblock consists of four Y blocks, two U blocks, and two V blocks. In the 4:2:2 format, each 16×16 pixel Y block is associated with one U and one V block having size 16×8 pixels. In this format, 2 Y pixels share 1 U and 1 V pixel.

A 4:4:4 macroblock consists of four Y blocks, four U blocks, and four V blocks. Each 16×16 pixel Y block is associated with one U and one V block of size 16×16. Therefore, the 4:4:4 format stores an equal number of Y, U and V pixels.

Data formats typically used to store color space components during the MPEG 2 decoding process prevent large sequential blocks from being transferred during a sequential transfer mode. Planar data formats are typically used to store the YUV data in memory during the decoding process. In planar formats, each of the color space components is stored in horizontal scan line order in memory, and these blocks of memory may or may not be adjacent. Since all of the bytes within each color space component are not stored sequentially in the planar formats, only short burst reads or writes can be performed to read each line. Therefore, the advantages of a sequential transfer mode cannot be fully realized.

For example, in the 4:2:0 chroma format, for each 16×16 pixel Y block, the corresponding U and V blocks have size 8×8 pixels. Assuming each pixel comprises 1 byte, it takes 16 burst accesses to read or write a 16×16 pixel Y block, with each burst access reading or writing 16 bytes. In addition, it takes another 2×8=16 burst accesses to read or write the U and V blocks. Thus, a total 32 burst accesses are needed for each macroblock access.

Using the 4:2:2 chroma format, each 16×16 pixel Y block is associated with one U and one V block having size 16×8 pixels. Therefore, 16 burst accesses are necessary for the Y block, the U block and the V block, totaling 48 burst accesses for each macroblock.

In the 4:4:4 chroma format, each 16×16 pixel Y block is associated with one U and one V block of size 16×16. Since the number of lines in each U or V block is identical to that of the 4:2:2 format, 48 burst accesses are still required for each macroblock. The only difference between the 4:2:2 and 4:4:4 formats is that each U or V access reads or writes 16 bytes in the 4:4:4 format instead of 8 bytes in the 4:2:2 format.

In a software based decoder, the probability that required data is in a cache is called a "hit rate". If the data is not found in the cache, a cache "miss" occurs. If there is a cache "miss", the processor must then access the main memory. The probability of a "hit" is complex, and is related to the size of the block of data, as well as other factors.

As described above, when the data is stored in the planar format, a burst access may read or write only 16 bytes. The advantages provided by a burst mode cannot be realized in such a system. Moreover, the probability of a cache miss in a software based decoder can be substantially decreased with an improved data storage system. A need exists for a method for decreasing the required data bus bandwidth and increasing the efficiency of the decoding process in software and hardware based decoders.

BRIEF DESCRIPTION OF THE INVENTION

The present invention includes a method and apparatus for storing a macroblock from a video data stream during video decoding. Video processing is data intensive and speed is of particular importance during processes such as motion compensation and color space conversion. Minimizing data bus bandwidth, therefore, is essential to increasing efficiency during these functions.

First, a macroblock within a frame is received from a digital video data stream. The macroblock comprises a plurality of color space components, each color space component having at least one block. Each block comprises a plurality of lines, with each line comprising a plurality of pixels. The macroblock has a width defined by a plurality of pixels.

According to a first aspect of the present invention, the contents of a macroblock are stored in a vertical strip format. First, pixels defining the plurality of color space components are stored in sequential bytes in a contiguous memory block. Next, a position of the macroblock within the frame is determined. For example, the position may be defined by a row and column designation. Next, a number of macroblocks to skip before storing the contiguous block in a vertical strip corresponding to the column designation is calculated. This allows the macroblock to be stored in a vertical strip corresponding to the column designation. The calculated number of macroblocks is skipped, and the contiguous block is stored in a vertical strip in memory. Each vertical strip, once stored, will correspond to a column within the frame. According to a preferred embodiment of the present invention, the vertical strip has a width equal to the width of the macroblock.

Storing the macroblock in a vertical strip format provides substantial benefits when only a portion of a macroblock is accessed at one time. Storing each byte in contiguous addresses avoids interrupting a burst for an address jump, as required with planar formats. This is particularly important during color space conversion and motion compensation. The macroblock or macroblocks containing the portion may be accessed through the use of the burst mode, and the undesired data may then be discarded. Therefore, access to a portion of a macroblock, or a macroblock not aligned with a vertical strip may be quickly accessed in burst mode.

According to a second aspect of the present invention, the contents of a macroblock are interleaved and stored. The plurality of lines defining a first one of the color space components may be interleaved with the plurality of lines defining a second one of the color space components. In addition, the plurality of pixels defining the first color space component may be interleaved with the plurality of pixels defining the second color space component to form a set of interleaved lines. These interleaved lines may then be further interleaved with the plurality of lines defining a third one of the color space components.

Interleaving provides substantial benefits over traditional planar data formats. Interleaving alleviates the need to jump to obtain data for each color space component corresponding to each pixel. This is particularly important during motion compensation, since each reference macroblock must be read from memory to further decode each P and B frame. Reformatting the reference data minimizes the number of memory accesses. In hardware implementations, this substantially reduces the number of clock cycles required and hence bandwidth required on the data bus. Therefore, access to color space components for each pixel is made more efficiently than the traditional method.

According to a third aspect of the present invention, the contents of a macroblock are interleaved and stored in a vertical strip format. First, the contents of the macroblock are interleaved. The plurality of lines defining a first one of the color space components may be interleaved with the plurality of lines defining a second one of the color space components. In addition, the plurality of pixels defining the first color space component may be interleaved with the plurality of pixels defining the second color space component to form a set of interleaved lines. These interleaved lines may then be further interleaved with the plurality of lines defining a third one of the color space components. Second, the macroblock is stored in a vertical strip format, as described above. The vertical strip may have a width equal to the width of the macroblock. Where this is the case, since all color space components are interleaved, all color space components for one macroblock may be fetched simultaneously through the use of one burst access, thus decreasing the required bandwidth.

Through the use of this new video data storage system, more efficient use of the data buses is made. In hardware decoding implementations, burst mode accesses may be implemented. In these implementations, the number of bursts and clock cycles required to read and write the video data is minimized. Similarly, software based decoders may utilize the new video data storage system for increased efficiency.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

Video decoding typically includes the steps of dequantization, inverse discrete cosine transform (IDCT), motion compensation and color space conversion. Motion compensation and color space conversion are two of the most processing intensive steps of video decoding. Since video processing is a data intensive task, decreasing the required data bus bandwidth is essential to minimizing data bus traffic.

This invention presents a new system for storing the three color space components of digital video data for I, P and B frames. Although the present invention is particularly useful for storing YUV color space components, it is equally applicable to other color spaces such as RGB. The new data storage system is particularly applicable in video decoders, and is compatible with many video compression standards, such as ITU H.261. Many of these video compression standards compress or encode data on a macroblock by macroblock basis, resulting in a compressed data stream which then must be decompressed or decoded on a macroblock by macroblock basis. This new method for storing the color space components of video data is particularly useful with such systems.

Through the use of this new video data storage system, more efficient use of the data buses is made. In hardware decoding implementations, burst mode accesses may be implemented. In these implementations, the number of bursts and clock cycles required to read and write the video data is minimized. Alternatively, the new video data storage system may be used in software based decoders.

According to the present invention, there are three possible interleaving formats: vertical strip format, YUV interleaving (UV interleaving and Y-UV interleaving), and vertical strip/YUV interleaving format. Each macroblock of a frame is processed independently by the present invention.

Figure 3:
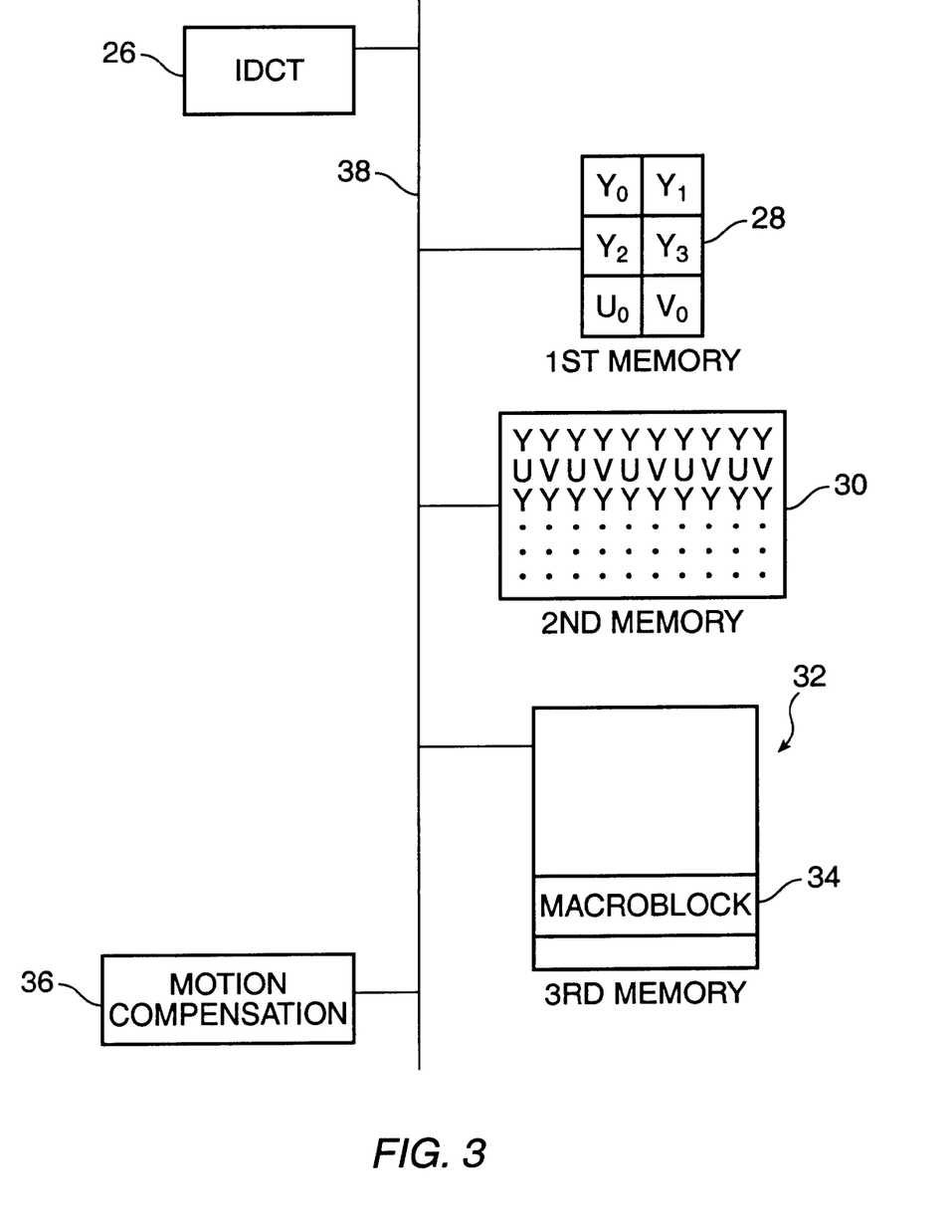
FIG. 3 is a block diagram illustrating a system in which the present invention may be implemented.

Referring now to FIG. 3, a block diagram illustrates a system in which the present invention may be implemented. According to a presently preferred embodiment of the present invention, an Inverse Discrete Cosine Transform block 26 outputs each macroblock of a video frame. The macroblock comprises a plurality of color space components which are then stored in a first memory 28. The present invention then interleaves and stores the plurality of color space components in a second memory 30. A third memory 32 is provided for storing the interleaved macroblock 34 in a vertical strip. The present invention stores each interleaved macroblock 34 within a vertical strip in the third memory 32 for use by a Motion Compensation block 36 or other process. The present invention transmits information among the Inverse Discrete Cosine Transform block, the Motion Compensation block, and the first, second, and third memories via a data bus 38.

Figure 4:
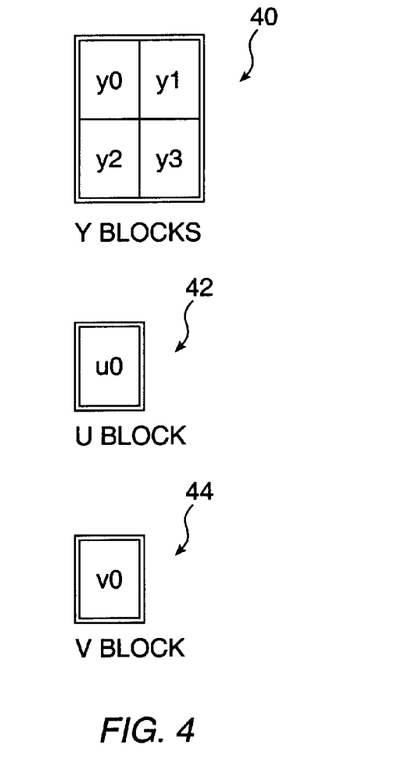
FIG. 4 is a block diagram illustrating the order in which blocks are output from the Inverse Discrete Cosine Transform process into the motion compensation process.

Referring now to FIG. 4, a block diagram illustrates the order in which color space component blocks within each macroblock are received by the present invention. For example, after IDCT, the color space component blocks are output. Motion compensation may then be performed on the macroblock. Each color space component block comprises an 8×8 block of pixels. For each I, P and B frame, the motion compensation process receives a first plurality of blocks defining a first color space component, or Y blocks 40, followed by a second plurality of blocks defining a second color space component, or U blocks 42, then a third plurality of blocks defining a third color space component, or V blocks 44, in horizontal scan line order as shown. For example, y1 follows y0, and y3 follows y2. For each P and B frame, these blocks comprise differential data which must be added to the appropriate reference data. Although MPEG 2 decoders typically use a 4:2:0 chroma format, as shown, one of ordinary skill in the art will readily recognize that alternative chroma formats are possible. The motion compensation process then stores and uses this video data.

Figure 5:
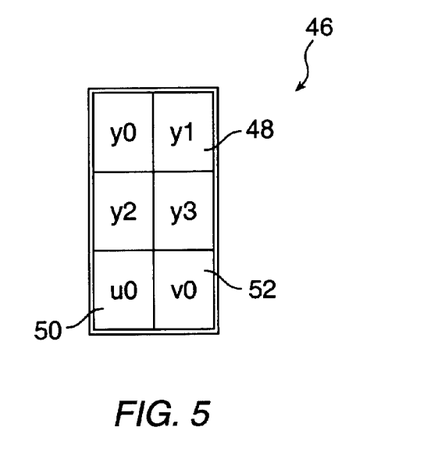
FIG. 5 illustrates a storage format for storing color space component data.

Referring now to FIG. 5, a format for storing color space component data in the first memory is presented. According to a presently preferred embodiment of the present invention, each Y, U, and V block is received by the Motion Compensation block 36 from the IDCT block 26 and stored in the first memory 28 shown in FIG. 3, according to a block numbering system shown in FIG. 5. Each macroblock 46 comprises a plurality of color space components Y 48 having blocks y0–y3, U 50 having block u0, and V 52 having block v0. As shown, each of the plurality of color space components include at least one block. Each block further includes a plurality of lines having a plurality of pixels. According to a presently preferred embodiment of the present invention, the first memory comprises 24 lines×16 pixels of data, and each Y block 48 y0–y3 is stored adjacent to another Y block. In this manner, the color space component information is stored in a format which facilitates retrieval of the data. However, one of ordinary skill in the art will recognize that alternative storage formats are possible.

According to a first aspect of the present invention, the YUV information for each pixel is interleaved. According to a presently preferred embodiment of the present invention, the data from the first memory 28 shown in FIG. 3 is interleaved and stored in the second memory 30 shown in FIG. 3. According to a presently preferred embodiment of the present invention, the interleaved data is stored in a vertical strip having a width equal to the width of the macroblock, or 16 pixels. Interleaving may be accomplished through interleaving lines defining one color space component among lines defining a second and third color space component. Similarly, pixels defining the first color space component may be interleaved with pixels defining a second color space component to form a set of interleaved lines. These interleaved lines may be further interleaved with lines defining the third color space component. According to a presently preferred embodiment of the present invention, all Y lines are interleaved with a plurality of UV lines, each of the plurality of UV lines containing interleaved UV data.

If the interleaved macroblock being stored corresponds to a P or B frame, the interleaved macroblock comprises differential data which must be added to a reference macroblock which has similarly been interleaved and stored. If the frame is a P frame, only one reference macroblock must be fetched. If the frame is a B frame, two reference macroblocks are averaged to create the reference macroblock. The location of each reference macroblock is determined based upon motion vectors corresponding to the interleaved macroblock being stored.

Figure 6:
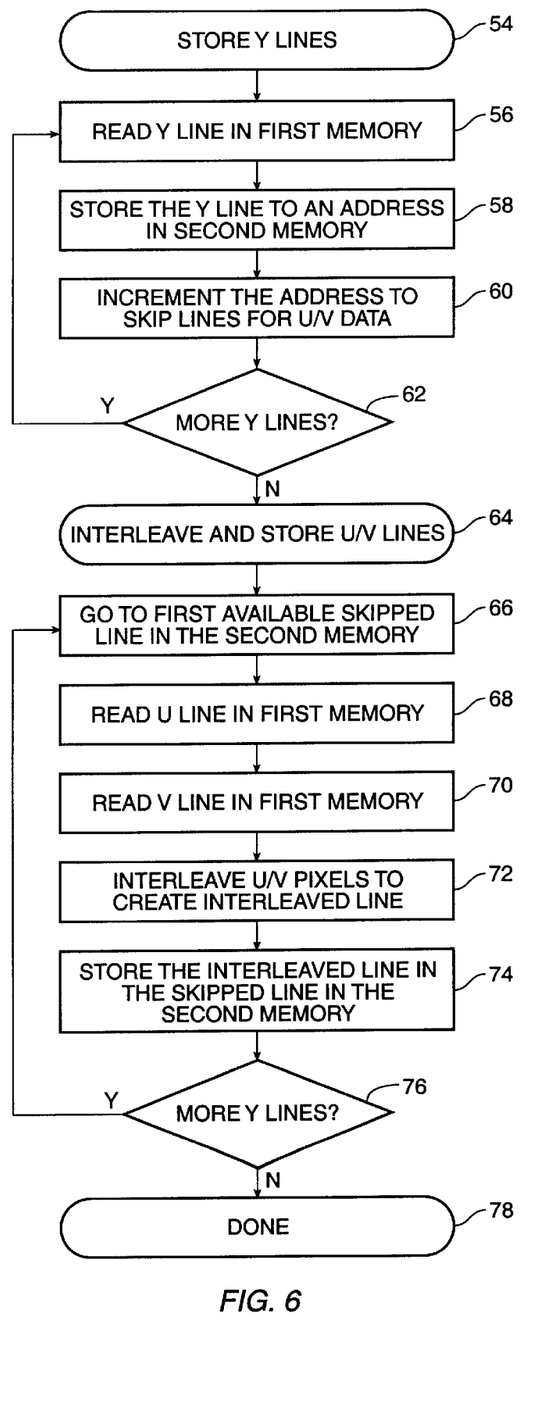
FIG. 6 illustrates a method for interleaving a macroblock and storing the interleaved macroblock.

Referring now to FIG. 6, a method for interleaving a macroblock and storing the interleaved macroblock in the second memory shown in FIG. 3 is presented. According to a preferred embodiment of the present invention, lines within the first memory 28 shown in FIG. 3 are read sequentially, interleaved, and stored in the second memory 30 shown in FIG. 3. Alternatively, each interleaved macroblock 34 may be stored directly in a vertical strip in the third memory 32. First, Y lines are stored beginning at step 54. At step 56, a Y line is read from the first memory 28. Next, the Y line of the first memory obtained in step 56 is stored to an address in the second memory at step 58. Next, at step 60, the address is incremented to skip one or more lines for later storage of U, V, or UV data. If it is determined at step 62 that there are more Y lines, steps 56–60 are repeated until all Y lines have been written to the second memory. Next, all U and V lines are interleaved and stored at step 64. An address corresponding to the first available skipped line in the second memory is obtained at step 66. Next, a U line is read from the first memory at step 68 and a V line is read from the first memory at step 70. The pixels within the U and V lines are then interleaved into one interleaved line at step 72. At step 74, this interleaved line is written to the second memory in the skipped line. This process is repeated for all U and V lines at step 76 until the process is completed at step 78. One of ordinary skill in the art will readily recognize that the order that the Y, U and V lines are read from the first memory, interleaved and stored in the second memory may vary depending upon the order in which the blocks are stored within the first memory. According to a presently preferred embodiment, the second memory comprises 24 lines×16 pixels of data.

Figure 7:
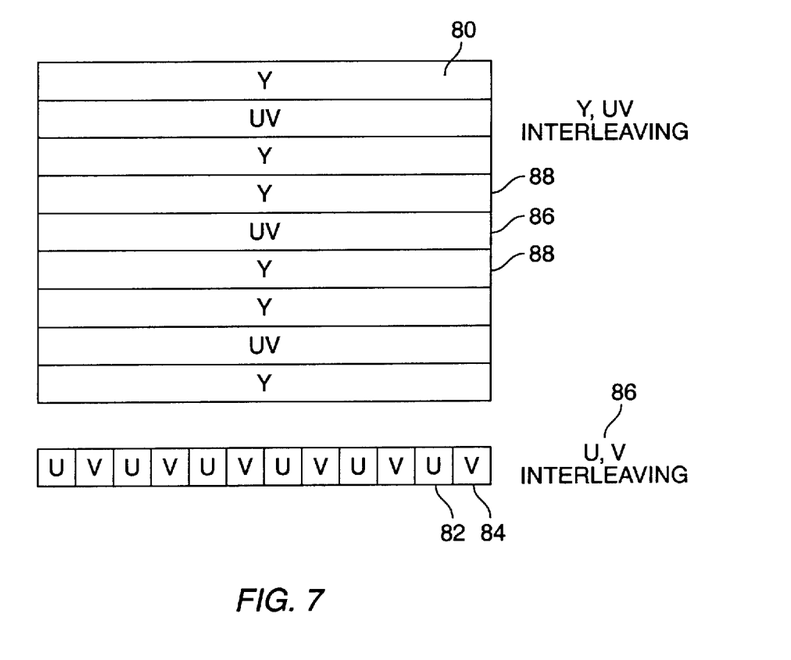
FIG. 7 illustrates the use of YUV interleaving with a 4:2:0 chroma format.

For example, as illustrated in FIG. 7, when the 4:2:0 chroma format is used, every four pixels of Y 88 correspond to one U 82 and one V 84 pixel. Therefore, each line of UV 86 is sandwiched between two Y lines 88. Furthermore, within each UV line 86, every U pixel 82 is interleaved with one V pixel 84. According to the YUV-interleaving format, the UV line 86 may be interchanged with one of its corresponding two Y lines 88. Similarly, the order of the U 82 and V 84 pixels within each UV line 86 may be interchanged according to the YUV-interleaving format. In this case, the YUV-interleaving format allows one line of U and V 86 to be read in one burst access rather than two. If the macroblock is fully aligned within a vertical strip, the macroblock comprises 24 lines, each line having 16 pixels, it takes 24 burst accesses. This is a significant improvement over the 32 accesses required with the traditional method.

Figure 8:
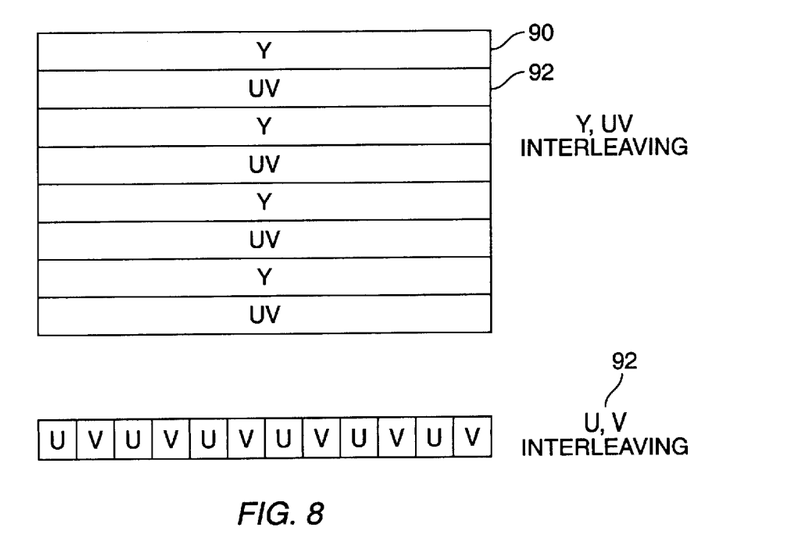
FIG. 8 illustrates the use of YUV interleaving with a 4:2:2 chroma format.

FIG. 8 illustrates the use of YUV interleaving with a 4:2:2 chroma format. When a 4:2:2 chroma format is used, every Y line 90 is interleaved with one UV line 92, rather than two lines as with the 4:2:0 format. As discussed above, the positions of the rows may be interchanged consistent with the YUV-interleaving format. In this instance, when the macroblock is fully aligned within a vertical strip, it takes 32 burst accesses, providing a substantial improvement over the 48 accesses required with the traditional method.

Figure 9:
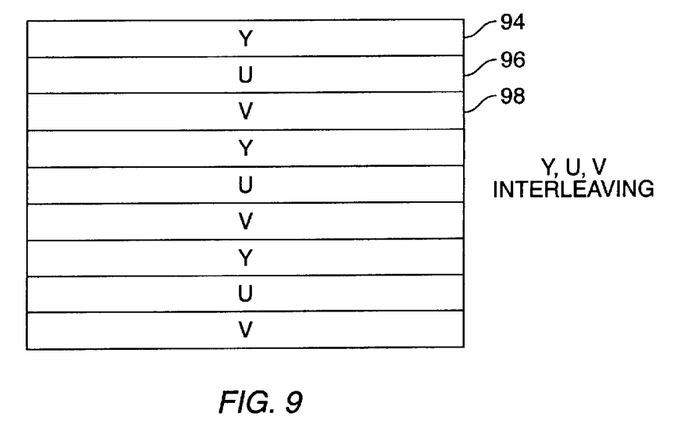
FIG. 9 illustrates the YUV interleaving format with a 4:4:4 chroma format.

FIG. 9 illustrates the YUV interleaving format with a 4:4:4 chroma format. In this case, Y 94, U 96 and V 98 are placed on separate lines. The position of the Y, U, and V lines within each group may be interchanged.

According to a second aspect of the present invention, a vertical strip data storage format is used. According to a preferred embodiment of the invention, the width of the strip is equal to the width of the macroblock being stored. However, one of ordinary skill in the art will readily recognize that each macroblock may not be aligned with the vertical strip. This vertical strip format may be used alone or in conjunction with the YUV-interleaving format. However, the plurality of pixels defining each of the macroblocks must be stored sequentially in a contiguous block in order to use a burst access mode, as described above.

Figure 10A:
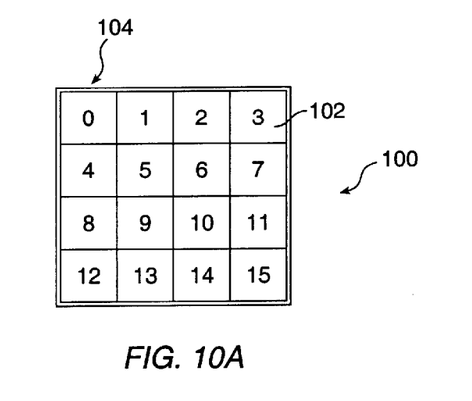
FIG. 10A illustrates a video frame comprising a plurality of macroblocks prior to decoding.

Referring now to FIG. 10A, a frame 100 comprising a plurality of macroblocks 102 is illustrated. Each macroblock numbered 0–15 is processed in scan line order 0–15, and is associated with a column 104. Each macroblock may be represented in XY coordinates to allow address calculations to be performed in hardware implementations. According to a presently preferred embodiment of the present invention, the uppermost left macroblock within the frame is numbered macroblock0, and the address is incremented from left to right and top to bottom until the entire frame has been constructed, as shown. One of ordinary skill in the art, however, will readily recognize that alternative addressing schemes could be used.

Figure 10B:
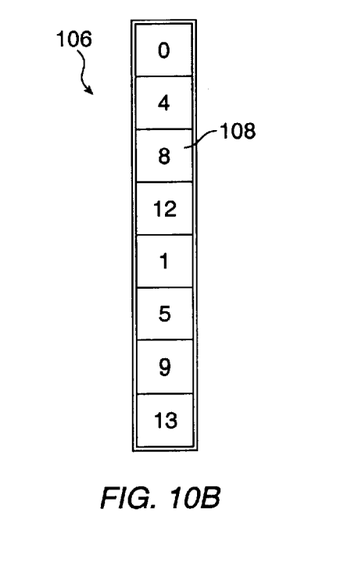
FIG. 10B illustrates a vertical strip format used to store macroblocks after decoding.

Referring now to FIG. 10B, a vertical strip format 106 used to store macroblocks 108 is shown. Each vertical strip will contain a number of macroblocks depending upon the resolution of the frame. For example, for a frame having a resolution of 720×576, 45 vertical strips having a width of 1 macroblock may be used, with each strip storing 36 macroblocks and having a length of 576 pixels. Although macroblocks are processed in scan line order, the macroblock columns are stored in vertical strip format to maintain the position of the macroblocks within the frame, as shown. Alternatively, the macroblock rows may be stored in a horizontal strip.

Figure 11:
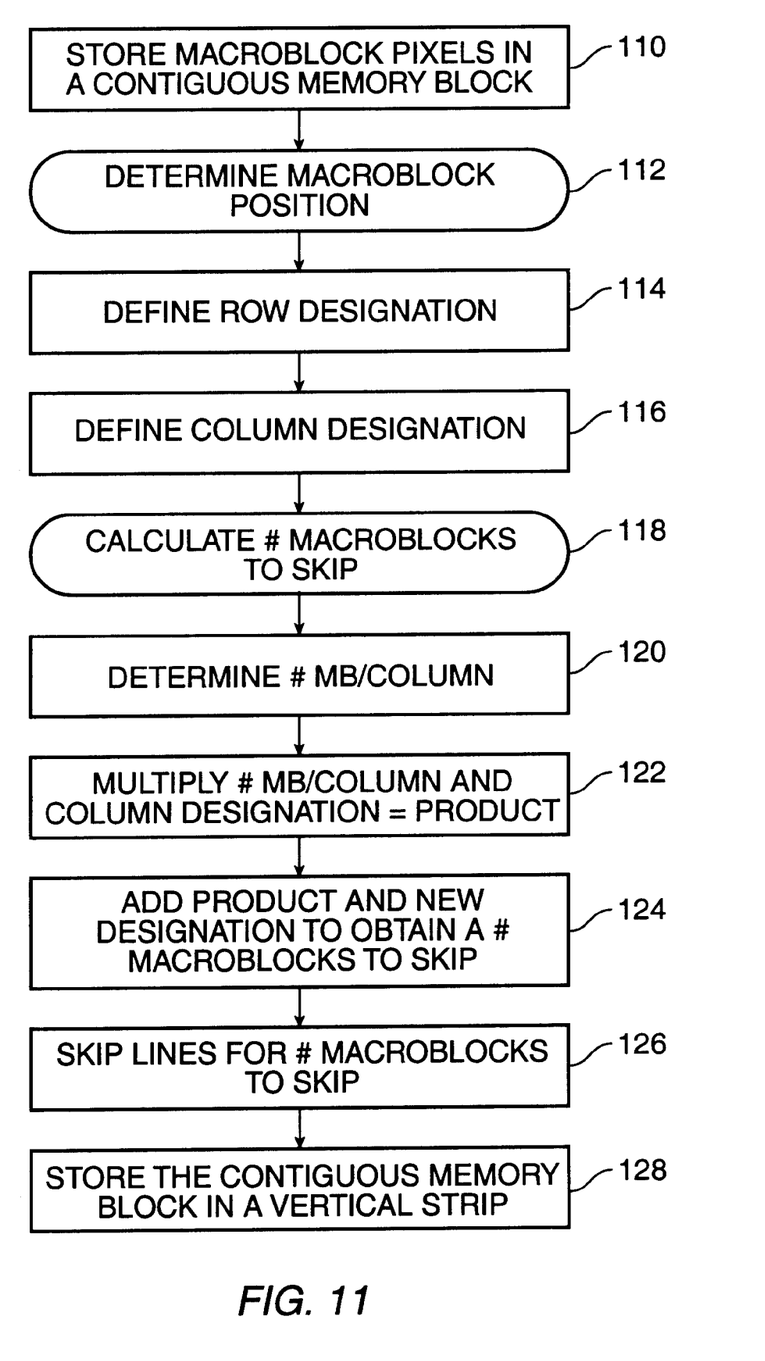
FIG. 11 is a flow chart illustrating a method for storing macroblocks in a vertical strip format according to a preferred embodiment of the present invention.

Referring now to FIG. 11, a flow chart illustrating a method for storing macroblocks in a vertical strip format is presented. Assuming the plurality of pixels defining the first, second, and third color space components of the macroblock are stored in sequential bytes in a contiguous block as described above at step 110, the contiguous block may then be stored in a vertical strip. A macroblock position within the frame is determined at step 112. According to a presently preferred embodiment of the present invention, a frame is divided into macroblock row and columns, allowing a position of a macroblock within the frame to be determined. For example, the macroblock may be identified by a row at step 114 and column at step 116 within the frame, with the first row and column starting at location 0. From this position, a number of macroblocks to skip before storing the contiguous block in a vertical strip is calculated at step 118. In addition, a number of macroblocks within each column within the frame is determined at step 120. The number of macroblocks to skip may then be calculated by first multiplying the column designation by the number of macroblocks per column at step 122, then adding the row designation at step 124. The calculated number of macroblocks is skipped at step 128, and the contiguous block is written in a vertical strip in memory. Thus, each macroblock within the frame may be stored in a vertical strip corresponding to the calculated macroblock column. Once all macroblocks within the frame have been stored, a number of vertical strips equivalent to the number of macroblock columns are sequentially stored. These vertical strips may be used to reconstruct the frame when each of the vertical strips is placed adjacent to one another. As a result, each of the macroblock columns are stored sequentially. According to a presently preferred embodiment, the left-most column within the frame is stored first, followed by the next left-most column.

According to a presently preferred embodiment of the present invention, each of the columns, or vertical strips, are stored in the third memory 32 as shown in FIG. 3. For example, macroblock 1 of FIG. 10A may be stored in the third memory 32 according to the method presented in FIG. 11. As described above, when a 4:2:0 chroma format is used, if the macroblock is fully aligned within a vertical strip as shown in FIG. 10A, the macroblock may comprise 24 lines, each line having 16 pixels. According to a presently preferred embodiment of the present invention, the third memory has a width of 64 bits. In order to accomodate a burst access mode, each macroblock is stored in 48 lines, each line having 8 pixels, or 64 bits. To store macroblock 1, the number of macroblocks to skip equals 0+(1×4)=4. Next, a jump is performed, and 48 lines are skipped for each of the 4 macroblocks to be skipped. Each line within macroblock 1 is then stored in the third memory 32, as shown in FIG. 10B.

According to another aspect of the present invention, when the YUV-interleaving format is used together with the vertical strip format having a strip width equal to the width of the macroblock, then only 1 burst access is needed to read or write an entire 16×16 macroblock. According to a presently preferred embodiment of the present invention, the interleaved data is stored in the third memory 32 of FIG. 3. Since the third memory 32 has a width of 64 bits, the third memory 32 is used to store each macroblock in 48 lines×8 pixels of data. Since each Y or UV line is stored in two consecutive words in the third memory 32, each 8 pixel word is written to the third memory 32 according to scan line order.

According to a presently preferred embodiment, the data bus is 64 bits wide, although those of ordinary skill in the art will recognize that other widths could be effectively used. When this data bus is shared, once the bus is requested, there is typically a latency period until the bus is granted, followed by a fixed number of cycles to access a fixed number of bytes of data. Therefore, the greater the number of bursts, the greater the number of clock cycles utilized. Thus, it is desirable to reduce the total number of bursts.

For example, assuming that it takes 1 clock cycle to read or write 8 bytes of data, and 7 clock cycles to access the bus, as previously discussed, when a 4:2:0 chroma format is used, 32 burst accesses are required to read or write 1 16×16 macroblock for the traditional planar data format. Therefore, it would take 32*7=224 clock cycles for getting access to the data bus, and 16*1 clock cycles to read the Y data+16*2 clock cycles to read the UV data=48 clock cycles to read the data, for a total of 272 clock cycles.

Similarly, when the YUV-interleaving format is used, as previously discussed, 24 burst accesses are necessary to read or write 1 16×16 macroblock. It follows that 24*7=168 clock cycles are used to access the bus, and 16 lines Y data*2 clock cycles +8 lines UV data*2 clock cycles=48 clock cycles to read the data, totaling 216 clock cycles.

If the vertical strip data format is used with the YUV-interleaving data format, 1 burst is required. Therefore, it takes 7 cycles to gain access to the bus and 48 cycles to access the data, for a total of 55 clock cycles.

Motion compensation is used to improve decompression of P and B frames. During motion compensation, it is often necessary to access only a portion of a macroblock. For example, according to the MPEG 2 standard, an unaligned reference macroblock is read to a half pixel resolution. The total number of clock cycles required is similarly reduced in these situations.

Figure 12A:
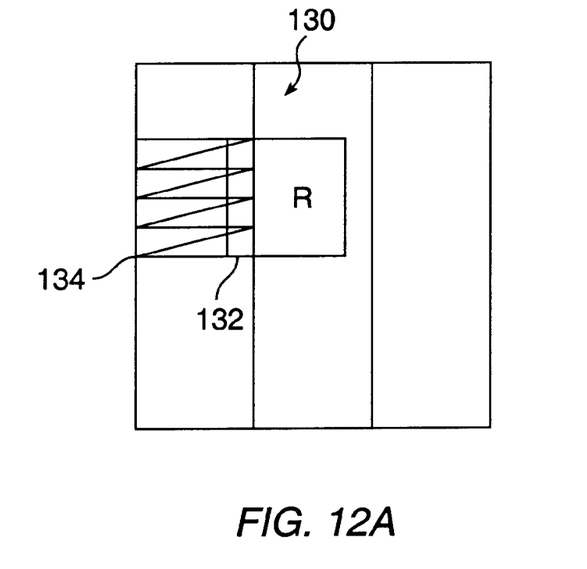
FIGS. 12A and 12B illustrate advantages of the interleaved vertical strip format when a macroblock is fetched across a vertical strip boundary.
Figure 12B:
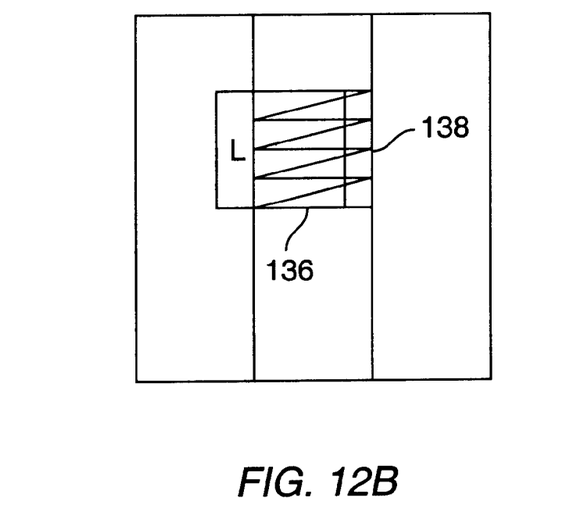

As illustrated in FIG. 12A, a macroblock 130 that lies across a vertical strip boundary may be read in 2 burst accesses. However, additional data in the remainder of the width of the strip must be read. First, a first portion 132 of the macroblock must be read by accessing a first macroblock 134 containing this first portion 132, and throwing away the pixels not in this first portion 132. Second, as shown in FIG. 12B, a second portion 136 of the macroblock must be read by accessing a second macroblock 138 containing this second portion 136, and throwing away the pixels not in this second portion 76. Therefore, assuming that the latency period is 7 clock cycles and 8 bytes may be read in one cycle, it takes 2*7+2*(24*2)=110 cycles to fetch an unaligned macroblock having a 4:2:0 chroma format.

Color space conversion is required to convert the color space components to the RGB color space prior to display on a conventional display device. During color space conversion, a portion of a macroblock is processed. For example, when color space conversion is performed with a macroblock having a 4:2:0 format, 2 Y lines having a width of 16 pixels, and one line of U and one line of V, both having a width of 8 pixels, are fetched. According to the traditional planar format, 2 burst accesses are required to read the Y lines, and 2 burst accesses for the U and V line are required. This results in 4*7+2*2+2*1=34 clock cycles. In the YUV-interleaved vertical strip format, one burst access is required, totaling 1*7+2*3=13 clock cycles.

As disclosed, hardware decoders in which burst mode accesses are implemented are made more efficient through the use of the present invention. The burst access mode accelerates the movement of large sequential blocks of data. Since the burst access mode requires that each byte be stored sequentially, the present invention provides a means for optimizing the advantages provided by such a sequential transfer mode.

Data bus traffic can be similarly reduced with the use of software based decoders. However, cache miss penalties may occur during data transactions between a primary cache and a secondary cache, or between main memory and a cache. Assuming that a primary cache has a width of 32 bytes, and the transaction between the primary and secondary cache is on a cache line basis, a macroblock in 4:2:0 format may be stored in planar format in 32 cache lines, one for each Y, U and V line. These 32 lines would also contain data from other macroblocks. According to the YUV-interleaving vertical strip data format of the present invention, this macroblock may be stored in 8 cache lines. More importantly, each cache line belongs to only one macroblock. Because each macroblock is more compactly loaded into cache, the probability of cache miss is lower during the decoding process. As a result, the YUV-interleaving vertical strip data format improves the speed of software based decoding.

Although this invention is used with the MPEG 2 ISO/IEC 13818 video compression standard, this invention can also be used with other compression standards, such as ISO/IEC 11172 (MPEG 1), ITU H.261, ITU H.263, and ITU H.324. This invention can, therefore, be applied to macroblocks having chroma formats other than 4:2:0, 4:2:2, and 4:4:4. Similarly, these formats can be used in both hardware and software based decoding. Moreover, although this invention is illustrated with a YUV color space, this is equally applicable to other color spaces, including the RGB color space.

Through the use of the present invention, YUV data is divided into vertical strips. Within each vertical strip, the data is YUV-interleaved and stored in scan line order. The strips are stored in memory according to strip order. According to a preferred embodiment of the invention, the width of the strip is equal to the width of the macroblock being stored. Thus, an entire frame containing a plurality of macroblocks may be stored in the above manner, where the height of each strip equals the height of the frame and the width of the strip equals the width of the macroblock. As a result, through reducing the number of burst transactions required, data bus traffic is minimized and bottleneck problems can be eliminated.

According to a preferred embodiment, the present invention may be implemented in software or firmware, as well as in programmable gate array devices, ASIC and other hardware.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for storing data of a macroblock of a video frame, the video frame including a plurality of macroblocks each having a first width, the macroblock data having a chroma format including a plurality of color space components, each of the plurality of color space components having at least one block of data, the block of data having a plurality of lines, each line including a plurality of pixels, the macroblock having a width of a plurality of pixels, the method comprising:

receiving the macroblock data from a digital video data stream;

defining a plurality of vertical strips in the video frame by dividing the video frame in the vertical direction, each vertical strip having said first width; and storing the macroblock data for the entire video frame into a contiguous memory in a vertical strip format in which a sequence of the stored macroblock data maintains a sequence of the corresponding macroblocks in the vertical direction within each vertical strip and a sequence of the vertical strips within the video frame.

2. The method according to claim 1, wherein the continuous memory includes a plurality of contiguous memory blocks, and wherein said storing further comprises:

determining a position of the macroblock corresponding to the macroblock data within the video frame, the position defined by a row and column designation;

calculating a number of memory blocks in the contiguous memory to skip before writing the macroblock data in a corresponding memory block;

skipping the calculated number of memory blocks; and writing the macroblock data into the corresponding memory block.

3. The method according to claim 2, wherein said determining further comprises:

defining the row designation position of the corresponding macroblock within the video frame; and defining the column designation position of the corresponding macroblock within the video frame, the video frame having a plurality of rows and columns starting at location 0.

4. The method according to claim 3, wherein said calculating further comprises:

determining a number of macroblocks per column within the video frame;

multiplying the column designation position of the corresponding macroblock and the number of macroblocks per column to produce a product; and adding the row designation position of the corresponding macroblock and the product to produce the number of memory blocks to skip.

5. The method according to claim 2, wherein in said writing, the macroblock data is written into sequential memory lines in the corresponding memory block according to a horizontal scan line order within the corresponding vertical strip in the video frame.

6. The method according to claim 1, further comprising interleaving the color space components of the macroblock data before the storing of the macroblock data into the contiguous memory.

7. A method for storing data of a macroblock of a video frame, the macroblock data having a chroma format having a plurality of color space components, each of the plurality of color space components having at least one block of data, the block of data having a plurality of lines, each line including a plurality of pixels, said method comprising:

receiving the macroblock data from a digital video data stream;

interleaving said plurality of color space components to create interleaved macroblock data; and writing the entire interleaved macroblock data for the macroblock into sequential memory lines in a contiguous memory block according to a horizontal scan line order within the macroblock.

8. The method according to claim 7, wherein said receiving comprises:

obtaining an I frame macroblock data set;

determining a P frame reference macroblock data set if the video frame is a P frame, based upon motion vectors corresponding to the interleaved macroblock data being stored; and adding the I frame macroblock data set to the P frame reference macroblock data set to create the macroblock data.

9. The method according to claim 7, wherein said receiving includes:

obtaining if the video frame is a B frame two reference macroblock data sets; and averaging the two reference macroblock data sets to create the macroblock data.

10. The method according to claim 7, wherein said interleaving comprises:

interleaving the plurality of lines defining the first color space component with the plurality of lines defining the second color space component and the plurality of lines defining the third color space component.

11. The method according to claim 7, wherein said interleaving comprises:

interleaving the plurality of pixels defining the first color space component with the plurality of pixels defining the second color space component to form a set of lines of interleaved pixels.

12. The method according to claim 7, wherein said interleaving comprises:

interleaving the plurality of pixels defining the first color space component with the plurality of pixels defining the second color space component to form a set of lines of interleaved pixels; and interleaving the set of lines of interleaved pixels with the plurality of lines defining the third color space component.

13. The method according to claim 7, wherein said interleaving comprises:

retrieving a first line from the block of data defining a first color space component;

storing the first line in a first memory line of the contiguous memory block;

skipping at least one memory line in the contiguous memory block;

retrieving a second line from the block of data defining the first color space component, the first and second lines being in a scan line order within the corresponding macroblock;

storing the second line in a second memory line of the contiguous memory block, the second memory line being adjacent to the at least one skipped memory line;

retrieving at least one third line from at least one of the blocks of data defining the remaining color space components; and writing the at least one third line in the at least one skipped memory line in the contiguous memory block, thereby the first line, the at least one third line, and the second line being stored in contiguous memory lines of the contiguous memory block in a scan line order within the corresponding macroblock.

14. The method according to claim 13, wherein said retrieving at least one third line includes:

interleaving pixels within a line retrieved from the block of data defining the second color space component with pixels within a line retrieved from the block of data defining the third color space component to form an interleaved third line.

15. The method according to claim 14, wherein in said interleaving, the pixels are arranged according to a scan line order.

16. The method according to claim 7, further comprising:

defining a plurality of vertical strips in the video frame by dividing the video frame in a vertical direction, each vertical strip having a column of macroblocks; and storing the interleaved macroblock data for the entire video frame in a plurality of contiguous memory blocks, by repeating the receiving, the interleaving, and the writing, wherein a sequence of the stored interleaved macroblock data for the entire video frame maintains a vertical sequence of the corresponding macroblocks within each vertical strip and a sequence of the vertical strips within the video frame.

17. A compressed video processing system, comprising:

means for receiving data of a macroblock of a video frame from a digital video data stream, the macroblock data having a plurality of color space components, each of the plurality of color space components having at least one block of data, the block of data having a plurality of lines, each line including a plurality of pixels;

means for interleaving the plurality of color space components to produce interleaved macroblock data; and means for writing the entire interleaved macroblock data for the corresponding macroblock into sequential memory lines in a contiguous memory block according to a horizontal scan line order.

18. A compressed video processing system, comprising:

means for receiving data of a macroblock of a video frame from a digital video data stream, the macroblock data having a plurality of color space components, each of the plurality of color space components having at least one block of data, the block of data having a plurality of lines, each line including a plurality of pixels;

means for defining a plurality of vertical strips in the video frame by dividing the video frame in the vertical direction, each vertical strip having a width of the macroblock; and means for storing the macroblock data for the entire video frame into a contiguous memory in a vertical strip format in which a sequence of the stored macroblock data maintains a sequence of the corresponding macroblocks in the vertical direction within each vertical strip and a sequence of the vertical strips within the video frame.

19. A compressed video processing system, comprising:

means for receiving data of a macroblock of a video frame from a digital video data stream;

a first memory for storing the received macroblock data, the macroblock data having a plurality of color space components, each of the plurality of color space components having at least one block of data, the block of data having a plurality of lines, each line including a plurality of pixels;

means for interleaving the plurality of color space components of the macroblock data stored in the first memory to produce interleaved macroblock data;

a second memory for storing the entire interleaved macroblock data for the macroblock in sequential memory lines of a contiguous memory block according to a horizontal scan line order within the macroblock; and a data bus connecting the first memory, the second memory, the receiving means and the interleaving means.

20. A compressed video processing system, comprising:

means for receiving data of a macroblock of a video frame from a digital video data stream;

a first memory for storing the received macroblock data, the macroblock data having a plurality of color space components, each of the plurality of color space components having at least one block of data, the block of data having a plurality of lines, each line including a plurality of pixels;

means for defining a plurality of vertical strips in the video frame by dividing the video frame in the vertical direction, each vertical strip having a width of the macroblock;

a second memory for storing the macroblock data for the entire video frame into a plurality of contiguous memory blocks in a vertical strip format in which a sequence of the stored macroblock data maintains a sequence of the corresponding macroblocks in the vertical direction within each vertical strip and a sequence of the vertical strips within the video frame; and a data bus for connecting the receiving means, the first memory, the defining means, and the second memory.

21. A compressed video processing system, comprising:

means for receiving data of a macroblock of a video frame from a digital video data stream;

a first memory for storing the received macroblock data, the macroblock data having a plurality of color space components, each of the plurality of color space components having at least one block of data, the block of data having a plurality of lines, each line including a plurality of pixels;

means for interleaving the plurality of color space components of the macroblock data stored in the first memory to produce interleaved macroblock data;

a second memory for storing the entire interleaved macroblock data for the macroblock in sequential memory lines of a contiguous memory block according to a horizontal scan line order;

means for defining a plurality of vertical strips in the video frame by dividing the video frame in the vertical direction, each vertical strip having a width of the macroblock;

a third memory for storing the interleaved macroblock data for all macroblocks included in the video frame;

means for writing the interleaved macroblock data stored in the second memory into the third memory in a vertical strip format in which a sequence of the interleaved macroblock data maintains a sequence of the corresponding macroblocks in the vertical direction within each vertical strip and a sequence of the vertical strips within the video frame; and a data bus for connecting the receiving means, the first memory, interleaving means, the second memory the defining means, the third memory, and the writing means.

* * * * *

UNITED STATES PATENT AND TRADEMARK OFFICE
CERTIFICATE OF CORRECTION

PATENT NO.   : 6,205,181 B1
DATED        : March 20, 2001
INVENTOR(S)  : Xiaoping Hu, Hungviet H. Nguyen, David Sokmin Kang It is certified that error appears in the above-identified patent and that said Letters Patent is hereby corrected as shown below:

<u>Column 6,</u>
Line 49, replace "linesX16" with -- lines x 16 --

<u>Column 7,</u>
Line 48, replace "linesX16" with -- lines x 16 --

<u>Column 9,</u>
Line 42, replace "linesX8" with -- lines x 8 --.
Line 62, replace "data+16*2" with -- data + 6*2 --.

<u>Column 10,</u>
Line 2, replace "data*2" with -- data * 2 --.
Line 3, replace "+8" with -- + 8 --.
Line 3, replace "data*2" with -- data * 2 --.

Signed and Sealed this

Second Day of April, 2002

Attest:

JAMES E. ROGAN
Attesting Officer      Director of the United States Patent and Trademark Office